United States Patent [19]

Okland

[11] 4,021,055
[45] May 3, 1977

[54] VEHICLE RUNNING BOARD

[76] Inventor: Merlyn C. Okland, 204 W. Broad St., Story City, Iowa 50248

[22] Filed: Apr. 8, 1976

[21] Appl. No.: 675,155

[52] U.S. Cl. .............................. 280/153 R; 280/163
[51] Int. Cl.² .......................................... B62B 9/16
[58] Field of Search ....... 280/163, 152, 153, 153.5, 280/154, 155

[56] References Cited

UNITED STATES PATENTS

| | | | |
|---|---|---|---|
| 1,266,938 | 5/1918 | Hassler | 280/163 |
| 1,809,711 | 6/1931 | Kile | 280/154.5 R |
| 1,905,895 | 4/1933 | Bronson | 280/163 |
| 2,158,813 | 5/1939 | Altmyer | 280/153 R |
| 3,684,311 | 8/1972 | Pierce | 280/163 |

*Primary Examiner*—Robert R. Song
*Attorney, Agent, or Firm*—Zarley, McKee, Thomte, Voorhees & Sease

[57] ABSTRACT

A vehicle running board comprising a horizontally disposed step portion having a support member extending upwardly from the inner end thereof. The upper end of the support member is secured to the vehicle cab at the lower portion thereof so that the forward end of the running board is positioned closely adjacent the front wheel opening. A plurality of braces are secured to the underside of the horizontally disposed step portion and extend upwardly and inwardly therefrom for connection to the cab. If desired, the forward end of the running board may be secured to a mud flap secured to the vehicle cab at the rearward end of the wheel opening.

2 Claims, 8 Drawing Figures

U.S. Patent   May 3, 1977   4,021,055
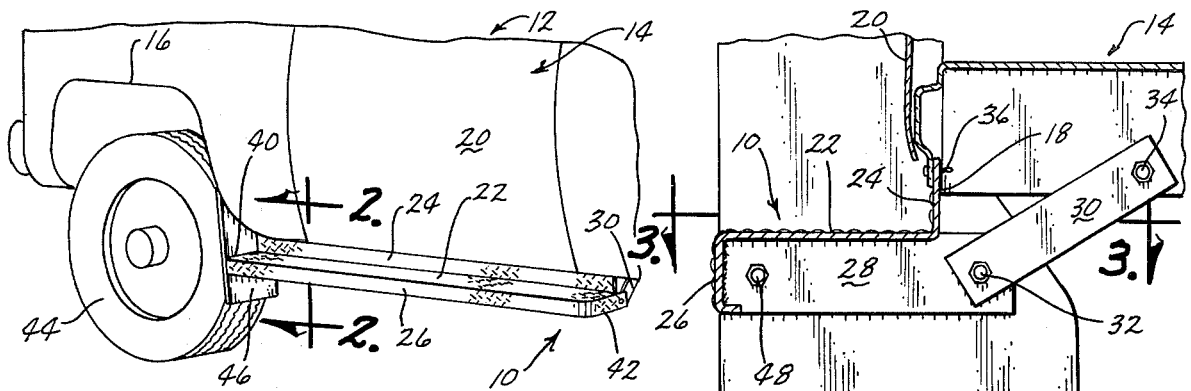
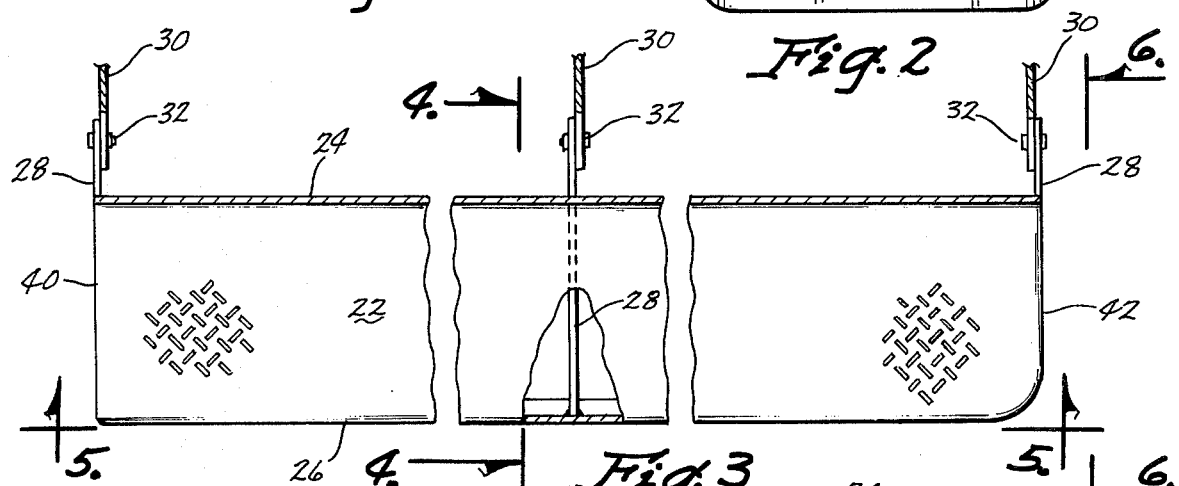
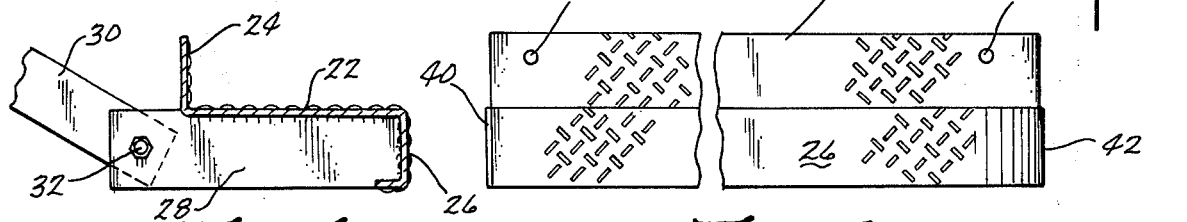
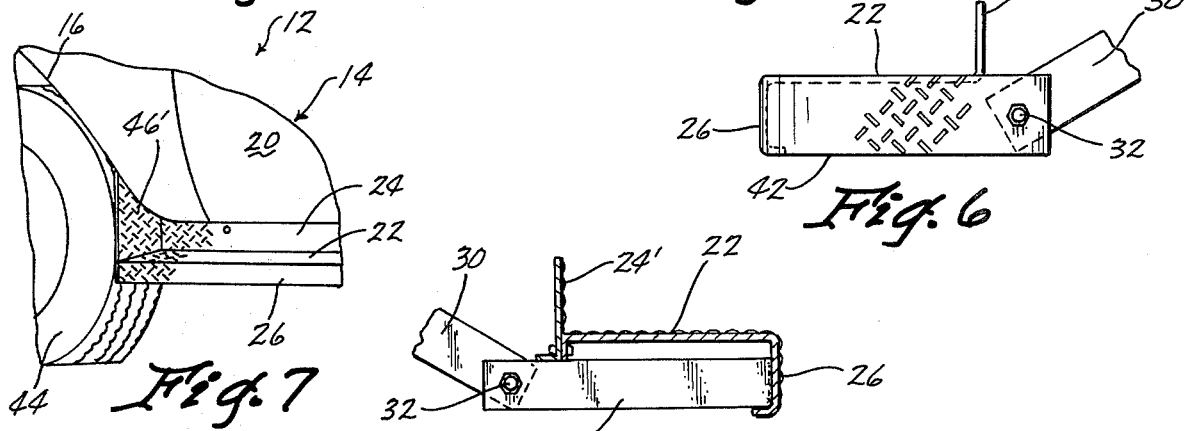

VEHICLE RUNNING BOARD

BACKGROUND OF THE INVENTION

This invention relates to a running board and more particularly to a running board for use with pickups, vans, recreational vehicles, etc.

Conventional vehicles of the type described hereinabove ordinarily do not have running boards which creates a problem in getting into the vehicle. A further problem encountered in the lack of running boards is that mud, rocks, dirt or the like is carried by the shoes into the interior of the cab. A still further disadvantage in the lack of running boards is that the front wheels of the vehicle tend to throw rocks upwardly and rearwardly into contact with the lower side of the vehicle cab. Running boards have been provided heretofore, but a convenient means has not been provided for securing the same to the vehicle cab.

Therefore, it is a principal object of the invention to provide an improved running board.

A still further object of the invention is to provide an improved running board for vehicles such as pickups, vans, recreational vehicles, etc.

A further object of the invention is to provide a running board for a vehicle including novel means for securing the same to the vehicle cab rather than the vehicle frame.

A still further object of the invention is to provide a running board for a vehicle which prevents the front wheels of the vehicle from throwing rocks or the like upwardly into engagement with the side of the cab.

A still further object of the invention is to provide a running board which is durable in use, refined in appearance and economical of manufacture.

BRIEF DESCRIPTION OF THE DRAWINGS

FIG. 1 is a partial rear perspective view illustrating the running board of this invention mounted on a vehicle:

FIG. 2 is an enlarged sectional view seen on lines 2—2 of FIG. 1:

FIG. 3 is a partial top view of the running board with portions thereof cut away to more fully illustrate the invention:

FIG. 4 is a sectional view seen on lines 4—4 of FIG. 3:

FIG. 5 is a view seen on lines 5—5 of FIG. 3:

FIG. 6 is an end view as seen on lines 6—6 of FIG. 3:

FIG. 7 is a partial rear perspective view of the modified form of the device; and FIG. 8 is a view similar to FIG. 4 except that a modified form of the device is illustrated.

DESCRIPTION OF THE PREFERRED EMBODIMENT

The running board of this invention is referred to generally by the reference numeral 10 and is designed to be attached to a vehicle 12. Vehicle 12 is of conventional design and comprises a cab 14 mounted to the vehicle frame in conventional fashion. Cab 14 is provided with a front wheel opening 16 and a horizontally disposed lower side portion 18. Cab 14 is also provided with a door 20.

Running board 10 generally comprises a horizontally disposed step portion 22 and a support member 24 which extends upwardly from the inner end thereof. The preferred embodiment of the running board is disclosed in FIG. 2 wherein support member 24 is integrally formed with the step portion 22. Running board 10 is also provided with an outer end portion 26 which extends downwardly from the outer end of step portion 22.

Running board 10 is provided with a plurality of spaced-apart supports 28 secured to the underside thereof by welding or the like and which are disposed transversely with respect to the longitudinal axis of the running board. As seen in FIG. 2, the inner ends of the supports 28 are disposed inwardly of support member 24. A brace 30 is secured at its lower outer end to the inner end of each of the supports 28 by bolt 32 as seen in FIG. 2. The inner end of brace 30 is secured to cab 14 by bolt 34. A plurality of threaded members such as screws 36 extend through openings 38 in support member 24 and are threadably received by the cab 14. As seen in FIG. 2, the upper end of support member 24 is positioned adjacent the lower portion 18 of the cab. The means by which the running board 10 is secured to the cab insures that the running board will move with the cab and insures that the running board will have the necessary support. As seen in FIG. 1, the forward end 40 of the running board 10 is disposed closely adjacent the rearward end of the wheel opening 16. As also illustrated in FIG. 1, the rearward end 42 of running board 10 is disposed rearwardly of the rearward edge of door 20.

The running board is installed as previously described and provides a convenient step for persons getting into the cab 14. The running board 10 also prevents the front wheel 44 from throwing rocks upwardly and rearwardly onto the lower sides of the cab since the forward end 40 is disposed closely adjacent the wheel opening and since the horizontal step portion 22 extends outwardly from the side of the cab.

If desired, a mud flap 46 may be employed in combination with the running board. FIG. 1 illustrates a flexible mud flap 46 secured to the cab 14 adjacent the rearward portion of the wheel opening 16. The mud flap 46 further aids in preventing rocks or the like from being thrown upwardly into engagement with the side of the cab. Additionally, the mud flap 46 may be used to provide additional support for the forward end of the running board 10 such as seen in FIG. 2. As seen in FIG. 2, the forwardmost support 28 is secured to the mud flap 46 by bolts 48 extending therethrough and by the bolt 32 which also extends therethrough as illustrated. FIG. 7 illustrates a modified form of the mud flap wherein the mud flap 46' is constructed of the same material as the running board. FIG. 8 illustrates a modified form of the support member 24 and it can be seen that the support member 24' is of separate construction as opposed to the unitary construction or integral construction of FIG. 2.

Thus it can be seen that a novel running board has been provided which accomplishes at least all of its stated objectives.

I claim:

1. A running board for use in combination with a vehicle having a cab mounted on a vehicle frame, front and rear wheels supporting said frame, said cab having a front wheel opening and a horizontally disposed lower portion extending rearwardly from said wheel opening, said running board comprising:

an elongated step member having in cross section a vertically disposed support portion, a horizontally disposed step portion extending outwardly from the lower end of said support portion, and a downwardly disposed outer end portion extending downwardly from the outer end of said step portion;

said support portion having means for securing its uppper edge to said horizontally disposed lower portion of said cab;

a plurality of elongated rigid reinforcing members being secured to the underside of said step portion and extending transversely thereof to terminate at inner ends located inwardly from said step member, a plurality of elongated braces each secured at its lower end to corresponding one of said inner ends of said reinforcing members by means permitting adjustable pivotal movement during mounting about a horizontal axis, said brace extending upwardly therefrom for securement to said vehicle frame at a point located inwardly of said upper end of said step member.

2. A device according to claim 1 wherein said step member includes a forward end which terminates adjacent said wheel opening with said step portion thereof being positioned below said lower portion of said cab, a mud flap secured at its upper end to said cab and extending downwardly therefrom to said forward end of said step portion of said step member, means operatively securing said mud flap to said step member.

* * * * *